United States Patent
Grassler et al.

(10) Patent No.: US 6,305,275 B2
(45) Date of Patent: Oct. 23, 2001

(54) REFRIGERATED PRODUCT CONTAINING PIECES OF CHOCOLATE AND A PROCESS AND AN ARRANGEMENT FOR ITS PRODUCTION

(75) Inventors: Walter Grassler, Polling; Manfred Wild, Meitingen, both of (DE)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/782,555

(22) Filed: Feb. 13, 2001

Related U.S. Application Data (62) Division of application No. 08/199,104, filed on Feb. 22, 1994, now Pat. No. 6,231,902.

(30) Foreign Application Priority Data

Mar. 18, 1993 (EP) .................................................. 93104420
Feb. 22, 1994 (EP) .................................................. 08199104

(51) Int. Cl.$^7$ ................................ A23L 1/00; A23B 1/00; A23G 1/00
(52) U.S. Cl. ................................ 99/453; 99/483; 99/516; 99/537
(58) Field of Search ................................ 99/452–455, 467, 99/472, 476, 483, 516, 532–535, 537, 538; 426/631, 103, 564, 565, 93, 289, 522, 613, 572

(56) References Cited

U.S. PATENT DOCUMENTS

| | | |
|---|---|---|
| 2,190,226 | 2/1940 | Alexander . |
| 2,282,313 | 5/1942 | Hershey . |
| 2,347,083 | 4/1944 | Connellee et al. . |
| 2,646,757 | 7/1953 | Hackmann . |
| 2,722,177 | 11/1955 | Routh . |
| 3,769,030 | * 10/1973 | Kleinert ................................ 426/631 |
| 3,959,516 | * 5/1976 | Warkentin ................................ 426/631 |
| 4,507,326 | 3/1985 | Tarantino ................................ 426/101 |
| 4,996,916 | * 3/1991 | Miyawaki et al. ........................ 99/453 |
| 5,058,494 | * 10/1991 | Hayashi et al. .......................... 99/453 |
| 5,415,534 | * 5/1995 | Bertrand et al. ...................... 118/24 X |
| 5,494,692 | * 2/1996 | Beyer et al. ....................... 426/103 X |
| 5,863,579 | * 1/1999 | Muzzarelli ........................... 99/453 X |

FOREIGN PATENT DOCUMENTS

| | | |
|---|---|---|
| 0221757 | 5/1987 | (EP) . |
| 1169500 | 5/1969 | (GB) . |
| 59-196028 | * 11/1984 | (JP) ..................................... 426/631 |

* cited by examiner

*Primary Examiner*—Timothy F. Simone
(74) *Attorney, Agent, or Firm*—Winston & Strawn (57) ABSTRACT

An apparatus for preparing a mousse which contains pieces of chocolate has a first line of apparatus members which are associated together and suitable for transporting, sterilizing and overrunning a milk-based mixture, which is suitable for being overrun and for preparing a mousse, and for transporting an overrun mixture and has a second line of apparatus members which are associated together and suitable for transporting and sterilizing a chocolate composition and for transporting a sterilized chocolate composition, and the lines separately feed a nozzle and contact zone tube assembly. In one embodiment, passages in the nozzle are positioned and configured so that, in operation, overrun mixture is delivered into the nozzle and an amount of chocolate composition is delivered into overrun mixture so that the composition has a form of a strand in the overrun mixture, and a cutting system is connected with the contact zone tube for cutting the strand into pieces. In another embodiment, passages are included in the second line with valves for introducing portioned amounts of chocolate composition into overrun mixture in the nozzle so that, in operation, a product with chocolate pieces is obtained. In each embodiment, a volumetric metering system is provided for filling the product of a mousse containing pieces of chocolate into a container.

10 Claims, 5 Drawing Sheets

REFRIGERATED PRODUCT CONTAINING PIECES OF CHOCOLATE AND A PROCESS AND AN ARRANGEMENT FOR ITS PRODUCTION

CROSS-REFERENCE TO RELATED APPLICATION

The present application is a divisional application of application Ser. No. 08/199,104 which was filed Feb. 22, 1994 now U.S. Pat. No. 6,231,902.

BACKGROUND OF THE INVENTION

The present invention relates to apparatus for preparing refrigerated products, particularly dessert products, and for combining differing compositions for preparing a composite product and more particularly, for preparing a mousse product which contains pieces of chocolate.

Refrigerated products containing pieces of chocolate are already available on the market. However, these known products have a storage life in a refrigerator of less than 10 days. This is because, from the moment when pieces of chocolate are dispersed in a mousse treated by a UHT, the diffusion of water from the mousse into the chocolate creates microbiological problems because the chocolate is not sterilized. On the other hand, due to the high sugar content of the chocolate, the diffusion of water breaks the crispy texture of the chocolate and the consumer no longer has any sensation of the presence of pieces of chocolate in the mousse.

SUMMARY OF THE INVENTION

The problem addressed by the present invention was to provide the consumer with a mousse-based product containing pieces of chocolate which would keep in a refrigerator for 5 to 6 weeks and in which the pieces of chocolate would remain intact over that period.

The present invention provides for obtaining a product based on at least one mousse and containing pieces of chocolate in which the mousse contains between 2 and 10% by weight of chocolate, the chocolate being sterilized and containing, by weight, from 50 to 70% of fats, from 30 to 50% of cocoa powder and from 1 to 10% of sugar, and the chocolate may contain from 1 to 3% by weight sugar.

To the end of preparing the product described above and for carrying out a process, as described below, for preparing the product, the present invention further provides an apparatus wherein members are associated together in a first line for transporting, sterilizing and overrunning an ingredient mixture suitable for preparing a mousse, members are associated together in a second line for transporting and sterilizing a chocolate composition, and the two lines are connected to a nozzle. In one embodiment, wherein the nozzle enables introducing the chocolate into the mousse ingredient mixture so that a strand is formed in the mousse ingredient mixture, a cutting system is provided for cutting the strand of chocolate for obtaining a mousse product containing chocolate pieces, and a volumetric metering system is connected with the cutting system for receiving a mousse containing the pieces and for filling the same into a container. In a second embodiment, the second line provides passages for transporting sterilized chocolate composition streams and has valves positioned for opening and closing the passages for intermittently delivering and distributing portioned amounts of the chocolate composition streams into the mousse ingredient mixture in the nozzle for obtaining a mousse product containing chocolate pieces, and a volumetric metering system is connected with the nozzle for filling the product into a container. In another embodiment, in a case when another mousse is filled also in a container with the chocolate-piece-containing mousse product, the nozzle employed is a rotary nozzle for receiving the mousse products from separate volumetric metering systems for filling in a container.

DETAILED DESCRIPTION OF THE INVENTION

In the context of the invention, a mousse is understood to be an overrun milk-based product additionally containing sugar, a flavoring ingredient (such as cocoa, chocolate or the like), cream and a thickener or gelling agent. An overrun product is understood to be a product which has undergone an increase in volume of from 80 to 120% through overrunning. However, it is pointed out that these limits are not critical.

According to the invention, a product with a longer storage life can be obtained because the chocolate used has been sterilized, the mousse being treated by UHT before overrunning. This treatment is only possible because of the low sugar content of the chocolate. The sugar used in the chocolate is sucrose or invert sugar or fruit sugar, such as glucose.

The refrigerated product according to the invention normally contains, in a cup, two different mousses each containing pieces of chocolate in the proportions indicated above. The invention also encompasses a refrigerated product based on two mousses, of which only one contains pieces of chocolate, and encompasses a product consisting of a single mousse containing the pieces of sterilized chocolate mentioned above. If the refrigerated product contains two mousses, filling may be carried out so that vertical or horizontal layers are formed, and if a rotary metering head is employed, spiral layers may be formed. A surface layer based on cream, for example whipped cream, may also be provided.

In terms of fats, the chocolate used consists of cocoa butter. The pieces of chocolate are between 1 and 4 mm in size and are uniformly distributed throughout the mousse.

The product keeps in a refrigerator at a temperature of from 4 to 8° C.

In the process provided for the production of the refrigerated product mentioned above in which the chocolate is sterilized and the mousse is separately treated by UHT and then overrun, a strand or pieces of chocolate is/are simultaneously delivered to an injection nozzle substantially in the middle of the stream of mousse, the chocolate is cut and then mixed with the mousse, and the mousse is introduced into containers either on its own or in combination with a second mousse by means of a rotary metering head.

In carrying out the process of the present invention, the chocolate is normally sterilized in a tank for from 10 to 30 minutes at a temperature of from 110 to 130° C. The mixture for the mousse is treated by UHT, i.e., for from 5 to 40 seconds at a temperature of from 130° to 150° C., and then overrun to obtain an increase in volume of from 80 to 120%.

The chocolate has to be delivered to the injection nozzle in the liquid state, i.e., at a temperature of from 25 to 30° C.

The mousse is delivered to the nozzle at a temperature of from 8 to 12° C. When the two streams are combined, the strand of chocolate has to be given time to solidify. Accordingly, a contact time of from 30 to 60 seconds has to be allowed before the strand of chocolate is cut.

The strand of chocolate is cut in such a way that the pieces of chocolate have an average size of from 1 to 4 mm.

In the embodiment based on the strand of chocolate, the strand and the mousse have to be delivered to the injection nozzle in such a way that they arrive at the same rate, namely at a rate of from 0.05 to 0.15 m/s.

The rate at which the mousse and the chocolate arrive at the nozzle is not critical and depends on the desired output.

In the second embodiment of the process, portioned amounts of chocolate for providing the pieces of chocolate are directly injected into the nozzle. This may be done, for example, with an alternating metering system comprising two lines each equipped with a valve, each of the lines alternately delivering the pieces of chocolate into the stream of mousse at a very high rate, which provides for intermittent delivery and distribution of the chocolate.

The mousse containing the pieces of chocolate then arrives in a tank which feeds a volumetric metering head which in turn directly fills the cup placed beneath it in the case of filling with a single mousse. If the cup is filled with two mousses, one containing pieces of chocolate and the other containing no chocolate, a volumetric metering unit for each mousse feeds a rotary metering head which then simultaneously delivers the two mousses into the cup.

In the apparatus installation of the present invention, the mousse preparation line operates continuously with an overrunning system before the injection nozzle. The chocolate sterilization line operates discontinuously and consists of a tank equipped with a heating jacket for sterilization. Arranged at the tank exit is a pump which delivers the chocolate to the nozzle under a pressure of from 2.5 to 3.5 bar.

The injection nozzle is the key element of the installation. It comprises a feed passage for the strand of chocolate and two feed passages for the mousse arranged symmetrically in a relation to the feed passage for the strand of chocolate.

The cross-section of the chocolate feed passage depends on the pressure under which the chocolate arrives, the overrun of the mousse and the desired percentage of chocolate in the mousse, which normally amounts to between 5 and 15% of the total cross-section of the stream of the mousse.

As mentioned above with reference to the process, the streams of chocolate and mousse must remain in contact before the strand of chocolate is cut. The distance between the injection nozzle and the cutting system is between 5 and 8 m. This distance enables the strand of chocolate to arrive at a temperature of the order of 12° C.

The system for cutting the strand of chocolate consists of an enclosure in which is mounted a rotary shaft driven by a motor and comprising several blades. Downstream of the blades, paddles are provided on the rotary shaft to promote mixing of the mousse with the pieces of chocolate.

The cutting system is followed on the production line by a holding tank connected to a volumetric metering unit which in turn is connected to a rotary nozzle known and used in the field of deep-frozen foods and ice creams.

The production line is either of the aseptic type or of the highly hygienic type.

The invention is described in more detail in following with reference to the accompanying drawings.

DETAILED DESCRIPTION OF THE DRAWING FIGURES

Figure 1:
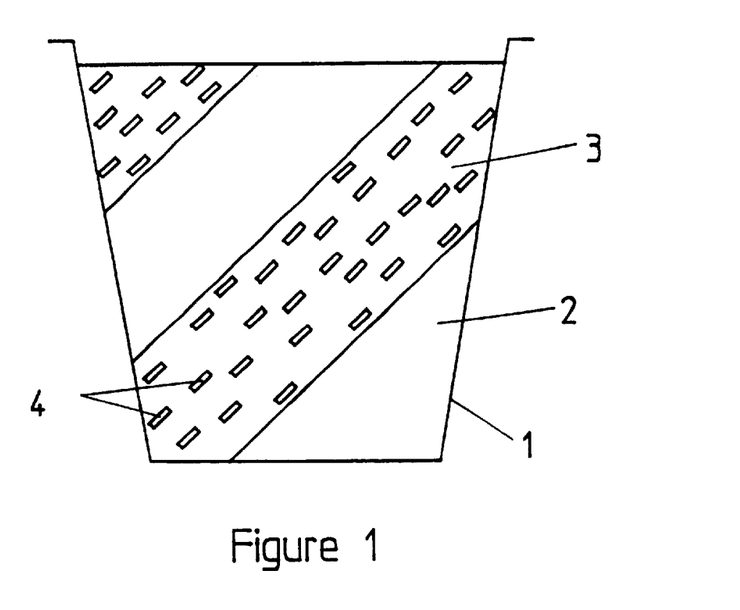
FIG. 1 is a side elevation of a refrigerated product according to the invention.
Figure 2:
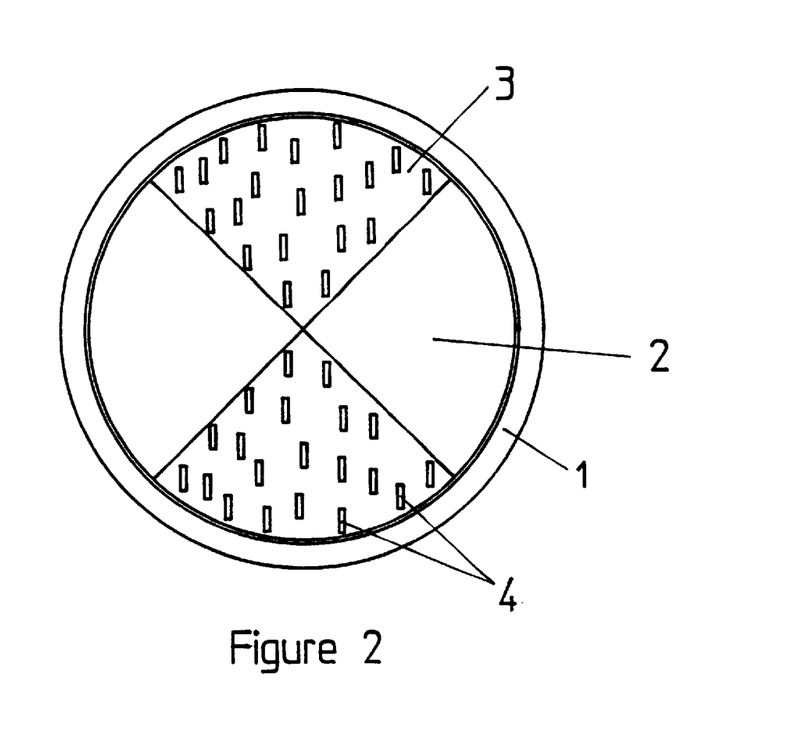
FIG. 2 is a view of the same product from above.

The product according to the invention, as illustrated in FIGS. 1 and 2, is packed in a cup (1) and consists of a mousse (2) and a mousse (3) containing pieces of chocolate (4). The total weight of the product may be 60 g, i.e., 15 g per zone. Filling with the rotary metering head creates a spiral appearance. For example, the mousse (3) may be a plain chocolate mousse with pieces of chocolate while the mousse (2) may be a coffee or milk chocolate mousse (2).

Figure 3:
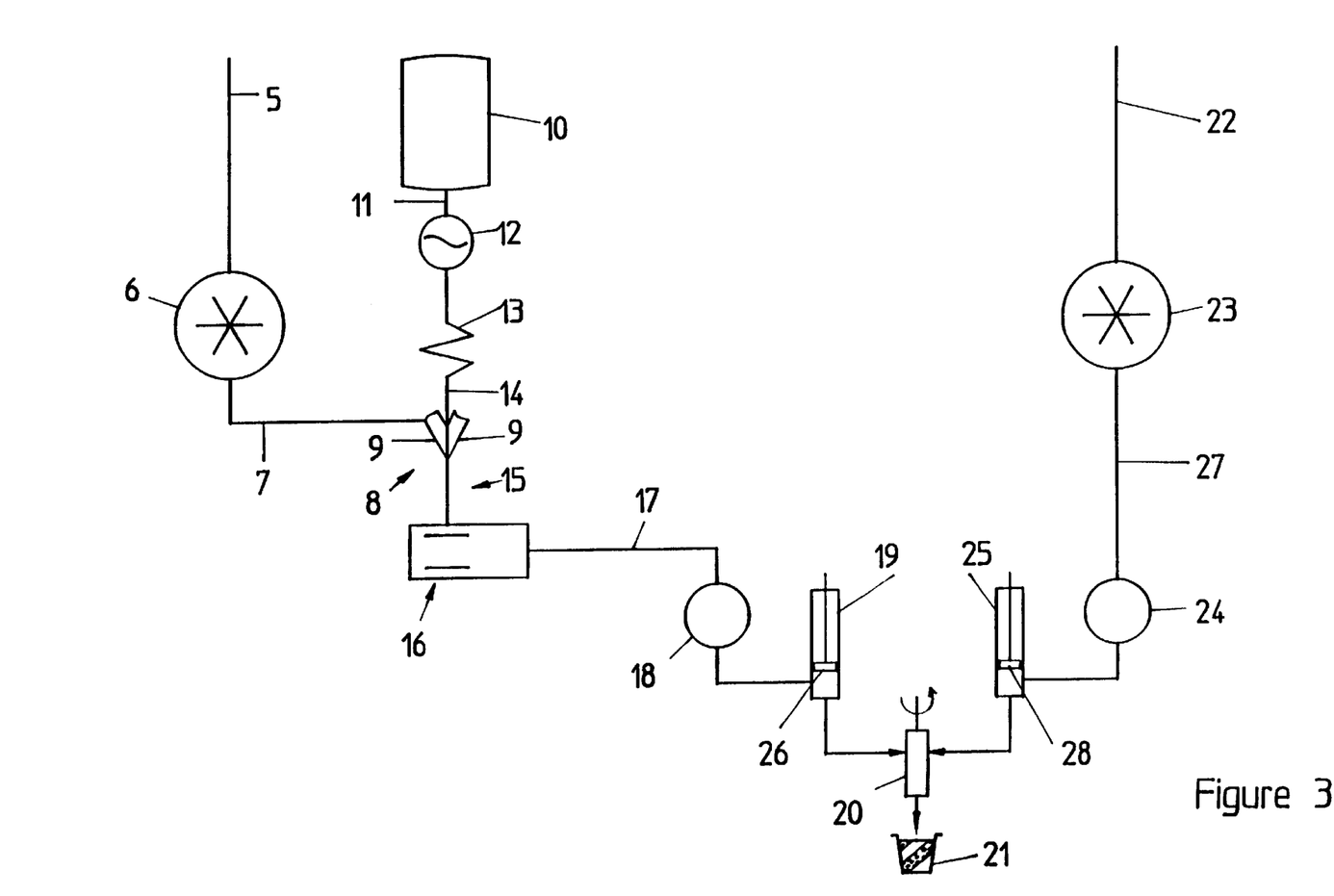
FIG. 3 diagrammatically illustrates a production line according to the invention.

Referring to FIG. 3, the mixture based on milk treated by UHT, which forms the mousse phase (3), arrives through the line (5). This mixture is overrun with nitrogen (or any other inert gas) in (6) so that an increase in volume of 120% is obtained.

The mousse (3) is delivered through the line (7) to the injection nozzle (8) which comprises two symmetrical feed passages (9).

The tank (10) is provided for sterilization of the chocolate. After sterilization, the chocolate passes through the line (11) and is delivered by the pump (12) to a cooling system (13) where the chocolate is cooled to around 30° C. It then passes through (14) to the injection nozzle (8).

A contact zone (15) is then provided in the form of a cylindrical tube in which the strand of chocolate solidifies in the stream of mousse. The cutting system (16) cuts the strand of chocolate, and the mixture of mousse and pieces of chocolate is delivered through the line (17) into a tank (18) from which it passes into a volumetric metering unit (19) comprising a piston (26).

The mousse (2) is correspondingly prepared from the line (22) which brings the UHT-treated milk-based mixture to the overrunning station (23). The mousse passes through the line (27) into a tank (24) from which it is fed into the volumetric metering unit (25) comprising a piston (28).

The metering units (19) and (25) then deliver the respective mousses in measured quantities into the rotary nozzle (20) so that the cup (21) can be filled.

The injection nozzle, the cutting unit and the rotary metering unit are described in more detail with reference to the following Figures.

Figure 4:
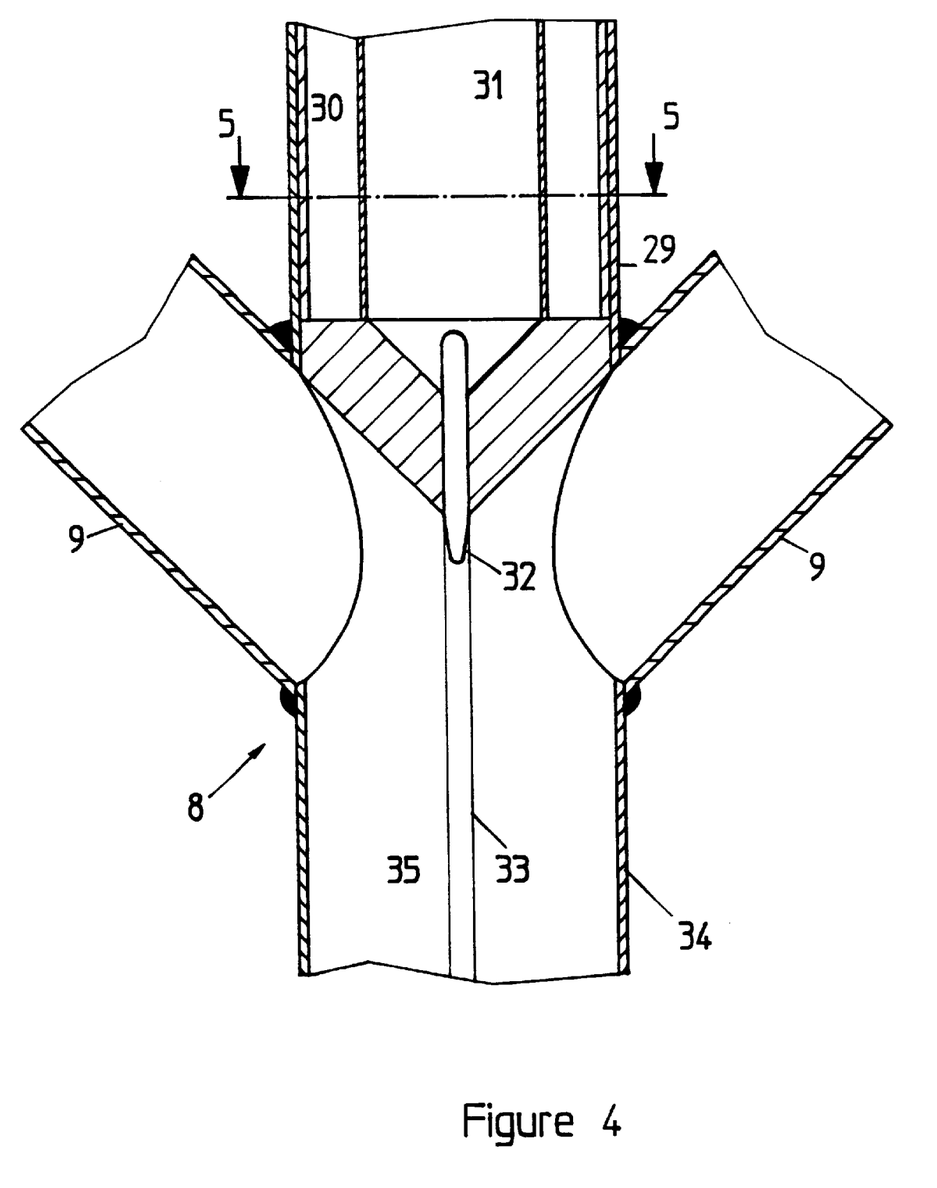
FIG. 4 diagrammatically illustrates an injection nozzle for obtaining a strand of chocolate.
Figure 5:
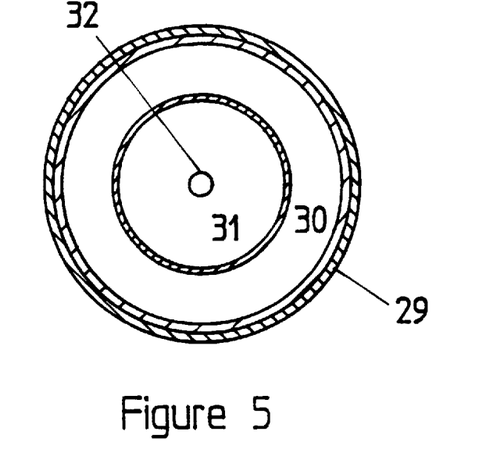
FIG. 5 is a section on the line 5—5 of FIG. 4.

FIGS. 4 and 5 show the injection nozzle (8) used in the installation shown in FIG. 3. This nozzle comprises two feed passages (9) for mousse and one feed passage (29) for chocolate, which is equipped with a heating jacket (30) to keep the chocolate in the liquid state, and the actual feed line (31) for the chocolate. The chocolate passes through the slot (32), which is round or oblong in shape, and forms a strand (33) in the mousse (35). As mentioned above, the line (34) is between 5 and 8 m in length.

Figure 6:
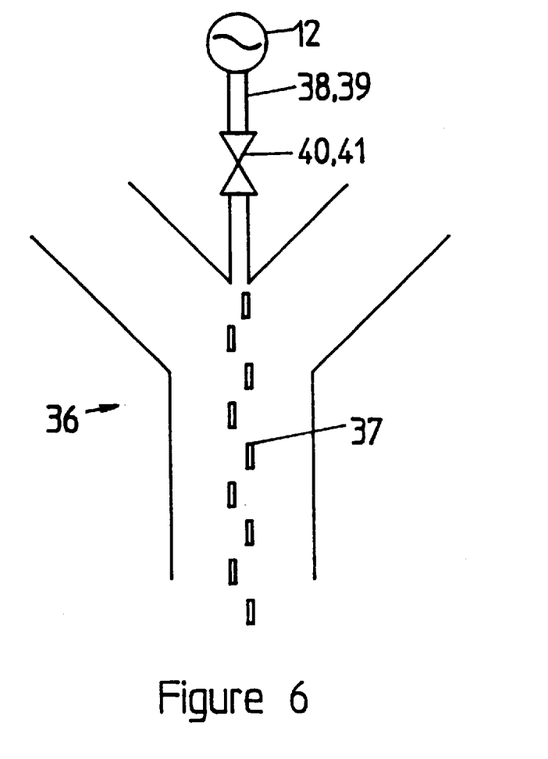
FIG. 6 diagrammatically illustrates an injection nozzle for obtaining pieces of chocolate.
Figure 7:
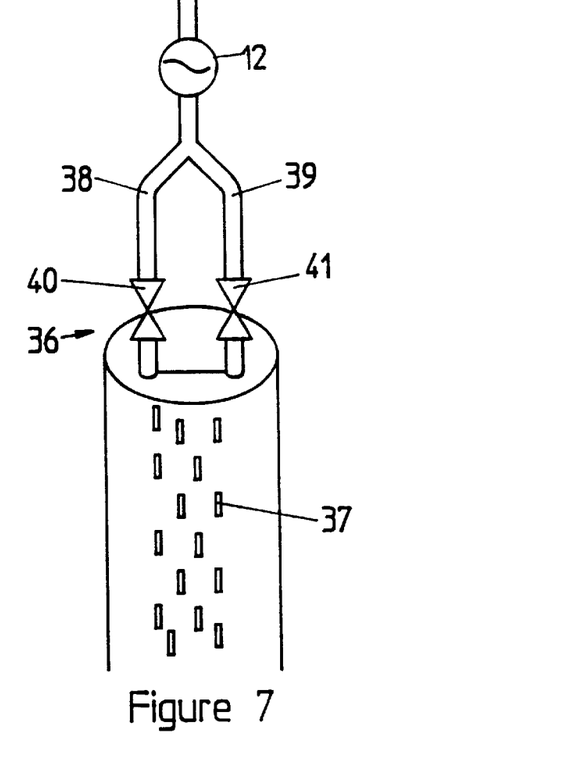
FIG. 7 is a diagrammatic illustration corresponding to FIG. 6, but at an angle of 90° in relation to FIG. 6.

FIGS. 6 and 7 show an embodiment of an injection nozzle (36) for directly obtaining pieces of chocolate (37). The feed stream of chocolate is separated after the pump (12) so that two streams (38, 39) are formed and the valves (40) and (41) are alternately opened and closed at a frequency of the order of one millisecond. Pieces of chocolate of the required size, i.e., from 1 to 4 mm, are thus obtained.

Figure 8:
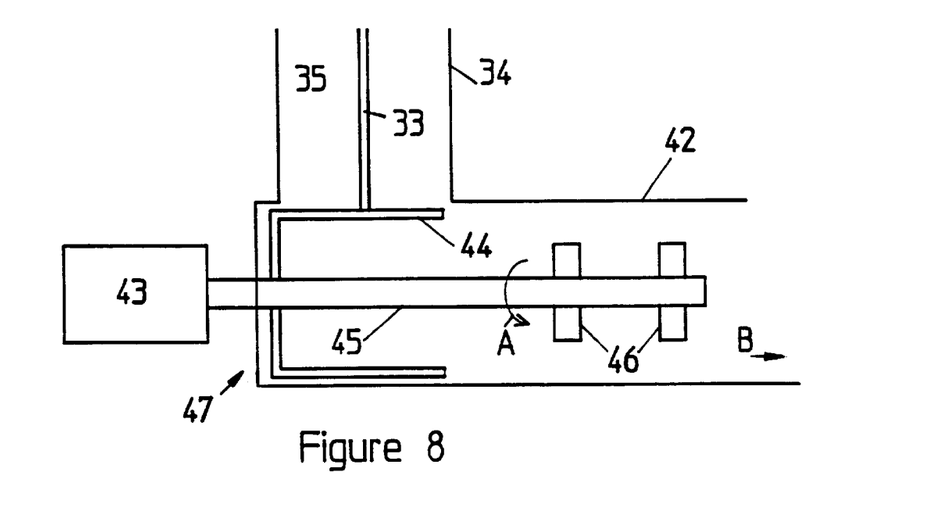
FIG. 8 diagrammatically illustrates a system for cutting the chocolate.

FIG. 8 shows the cutting system used in the installation shown in FIG. 3. The mousse (35) surrounding the strand of chocolate (33) arrives through the line (34) at the cutting station (47). The cutting station comprises in an enclosure (42) a rotary shaft (45) which is driven by a motor (43) and comprises blades (44) and mixing paddles (46) which are connected with the shaft. The shaft rotates in the direction of arrow (A) and the mixed product flows in the direction of arrow (B) to the tank (18). Six blades (44) are normally provided on the shaft.

The invention is further illustrated by the following Example.

EXAMPLE

A refrigerated product according to the invention consists of chocolate pieces and of a single plain chocolate mousse obtained from 65% (by weight) of skimmed milk, 14% of sugar, 7% of chocolate, 3% of cocoa powder, 5% of cream and known thickeners. The mousse makes up 94% and the chocolate pieces 6%.

The chocolate is made from 68% of cocoa butter, 30% of cocoa powder and 2% of sugar.

The chocolate is prepared by sterilization for 15 minutes at 125° C.

The mixture of mousse ingredients is heat-treated for 120 seconds at 130° C. and then cooled to 80° C. It is overrun with nitrogen under 7 bar to obtain an overrun of 120%.

The mousse is delivered at 8° C. to an injection nozzle at a rate of 500 kg/h. The chocolate is delivered at a rate of 40 kg/h and with a temperature of 30° C. The cutting system rotates at 200 r.p.m. and the product is packed under completely hygienic conditions at a rate of 120 cups per minute.

What is claimed is:

1. Apparatus for preparing a mousse containing pieces of chocolate comprising:
   members associated together in a first line suitable for transporting, sterilizing and overrunning a milk-based mixture, which is suitable for being overrun and for preparing a mousse, and for transporting an overrun mixture;
   members associated together in a second line suitable for transporting and sterilizing a chocolate composition and for transporting a sterilized chocolate composition;
   a nozzle and contact zone tube assembly wherein the nozzle is connected with the first and second lines and is positioned and configured with passages for, in operation, receiving therein and passing therethrough overrun mixture transported from the first line and sterilized chocolate composition transported from the second line so that an amount of sterilized chocolate composition is delivered into overrun mixture in the nozzle and passed with the overrun mixture form the nozzle through the contact zone tube for obtaining the sterilized chocolate composition in a form of a strand contained by the overrun mixture;
   a cutting system positioned and configured and connected with the contact zone tube for, in operation, receiving the overrun mixture containing the strand from the tube for cutting the strand for obtaining sterilized chocolate composition pieces distributed in the overrun mixture;
   a volumetric metering system connected with the cutting system for, in operation, receiving the overrun mixture containing sterilized chocolate pieces from the cutting system and for filling an amount of the mixture containing the pieces into a container.

2. Apparatus according to claim 1 wherein the cutting system comprises a rotary shaft and cutting blades connected with the shaft.

3. Apparatus for preparing a mousse containing pieces of chocolate comprising:
   members associated together in a first line suitable for transporting, sterilizing and overrunning a milk-based mixture, which is suitable for being overrun and for preparing a mousse, and for transporting an overrun mixture;
   members associated together in a second line suitable for transporting and sterilizing a chocolate composition and transporting a sterilized chocolate composition and further comprising passages for transporting streams of sterilized chocolate composition and valves for opening and closing the passages for delivering and distributing the sterilized chocolate composition from the second line intermittently in portions;
   a nozzle and contact zone tube assembly wherein the nozzle is connected with the first and second lines and is positioned and configured with passages for, in operation, receiving therein and passing therethrough a stream of overrun mixture transported from the first line and of sterilized chocolate composition portions transported from the second line passages so that chocolate composition portions are delivered into and distributed in the overrun mixture in the nozzle and passed with the overrun mixture through the contact zone tube for obtaining chocolate composition pieces distributed in the overrun mixture; and
   a volumetric metering system connected with the contact zone tube for receiving the overrun mixture containing chocolate composition pieces from the tube and for filling an amount of the mixture containing the pieces into a container.

4. Apparatus according to claim 1 or 3 further comprising a rotary product delivery nozzle connected with the volumetric metering system for filling the amount in a container.

5. Apparatus according to claim 1 or 3 wherein the nozzle to which the first and second lines are connected is configured with two passages for receiving two streams of transported overrun mixture and configured so that the passages for the two streams are arranged symmetrically with respect to and so that the sterilized chocolate composition is delivered into the overrun mixture at a position between the two passages.

6. Apparatus according to claim 1 or 3 further comprising a cool cooling the sterilized chocolate composition in the second line but only so that the sterilized chocolate composition cooled and transported to the nozzle and remains in a liquid state.

7. Apparatus according to claim 1 wherein the nozzle and contact zone tube assembly has a length which, when overrun mixture transported into the nozzle and tube assembly has a temperature of from 8° C. to 12° C. and when sterilized chocolate composition transported into the nozzle and tube assembly has a temperature of from 25° C. to 30° C., is sufficient for solidifying the sterilized chocolate composition strand during passage through the nozzle and tube assembly for obtaining the sterilized chocolate composition pieces by the cutting.

8. Apparatus according to claim 3 wherein the nozzle and contact zone tube assembly has a length which, when overrun mixture transported into the nozzle and tube assembly has a temperature of from 8° C. to 12° C. and when the sterilized chocolate composition transported to the nozzle and tube assembly has a temperature of from 25° C. to 30° C., is sufficient for solidifying the sterilized chocolate composition portions for obtaining sterilized chocolate composition pieces during passage through the nozzle and tube assembly.

9. Apparatus according to claim 7 or 8 wherein the nozzle and tube assembly has a length of from 5 m to 8 m.

10. Apparatus according to claim 1 or 3 wherein the first line members for sterilizing are suitable for providing ultra-high temperature treatment.

* * * * *

UNITED STATES PATENT AND TRADEMARK OFFICE
CERTIFICATE OF CORRECTION

PATENT NO. : 6,305,275 B2
DATED : October 23, 2001
INVENTOR(S) : Grassler et al.

It is certified that error appears in the above-identified patent and that said Letters Patent is hereby corrected as shown below:

Title page,
Item [30], Foreign Application Priority Data, delete
"Feb. 22, 1994 (EP)......08199104".

Column 5,
Line 59, change "form" to -- from --.

Column 6,
Line 52, change "a cool cooling" to -- a cooling system for cooling --.

Signed and Sealed this

Eighteenth Day of June, 2002

*Attest:*

*Attesting Officer*

JAMES E. ROGAN
*Director of the United States Patent and Trademark Office*